Patented June 4, 1929.

1,716,103

UNITED STATES PATENT OFFICE.

HENRY BLUMENBERG, JR., OF LOS ANGELES, CALIFORNIA.

PROCESS OF REFINING MINERAL-OIL PRODUCTS.

No Drawing.    Application filed January 12, 1927. Serial No. 160,762.

My invention relates to a process for refining hydrocarbon distillation products such as gasoline, kerosene and distillates and in particular the decolorization and deodorization thereof.

It is an object of this invention to provide a simple, economic and efficient process of treating mineral oil distillation products with aluminum sulphite or bi-sulphite and then elevating the temperature to distill off the volatile hydrocarbons.

My invention consists of the steps of the process hereinafter described and claimed.

Assuming that gasoline derived by the cracking process of mineral oils is to be treated, I add either aluminum sulphite or bi-sulphite, the amount of the reagent depending somewhat on the condition of the gasoline to be treated, but ordinarily from 2 to 5 per cent by weight of the SO$_2$ content will be sufficient to treat a given quantity of gasoline.

The mixture is thoroughly agitated for thirty to forty-five minutes while the temperature is elevated to 160 to 170° F. and the gasoline is distilled off and condensed. The condensate is now treated with an alkaline solution such as a one-half per cent of caustic soda to remove any sulphur dioxide. The resulting gasoline is water clear and free from any objectionable odor. The applicant is not prepared to explain the exact reactions taking place, but apparently the sulphur dioxide reacts in part with the unsaturated compounds, decomposing the sulphur carbon compounds while the aluminum ion apparently combines with the colloidal compounds, forming aluminum hydrocarbon compound.

In place of adding aluminum sulphite or bi-sulphite to the hydrocarbon to be treated the reagent may be formed within the mixture by adding aluminum oxide or hydroxide, agitating the mixture and contacting the same with sulphur dioxide.

Another modification is the production of the sulphite of aluminum within the body of the liquid to be treated by adding aluminum sulphate thereto and treating with a reagent such as calcium bi-sulphite, which will form a double decomposition, forming aluminum sulphite and calcium sulphate.

In place of adding my reagents to the distillation products they may be added directly to the crude mineral oil, but ordinarily it will be preferred to treat the distillate products of mineral oils.

Various changes may be made in the steps of the process by those skilled in the art without departing from the spirit of my invention, as claimed.

I claim:

1. A process of refining mineral oil comprising treating the same with a sulphite of aluminum, heating the mixture to a temperature of 160° F. and distilling off the volatile constitutents.

2. A process of refining mineral oil comprising treating the same with a sulphite of aluminium, heating the mixture to a temperature of 160° F., agitating the same, and distilling off the volatile constitutents.

3. A process of refining mineral oil comprising adding aluminum hydroxide to a hydrocarbon liquid, contacting the mixture with sulphur dioxide, heating to a temperature of 160° F. and distilling the volatile constituents thereof.

4. A process of refining mineral oil comprising adding a sulphite of aluminum to a hydrocarbon liquid, the quantity of the sulphite of aluminum being sufficient to contain from 2 to 5 per cent of sulphur dioxide of the liquid to be treated, heating the mixture to a temperature of 160° F., agitating the same, distilling off and condensing the volatile constituents and washing the latter with a dilute alkaline solution.

In testimony whereof I have signed my name to this specification.

HENRY BLUMENBERG, JR.